United States Patent
Zhan et al.

(10) Patent No.: US 7,274,995 B2
(45) Date of Patent: Sep. 25, 2007

(54) APPARATUS AND METHOD FOR IDENTIFYING POSSIBLE DEFECT INDICATORS FOR A VALVE

(75) Inventors: Charles Q. Zhan, Chandler, AZ (US); Joseph Z Lu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/717,086

(22) Filed: Nov. 19, 2003

(65) Prior Publication Data
US 2005/0104020 A1    May 19, 2005

(51) Int. Cl.
*G01B 5/28* (2006.01)
(52) U.S. Cl. .................................. 702/35
(58) Field of Classification Search ............ 702/35, 702/182, 181; 73/9, 587; 340/679
See application file for complete search history.

(56) References Cited

U.S. PATENT DOCUMENTS

| | | | |
|---|---|---|---|
| 5,262,958 A | 11/1993 | Chui et al. | |
| 5,381,697 A | 1/1995 | van der Pol | |
| 5,594,180 A | 1/1997 | Carpenter et al. | |
| 5,641,891 A | 6/1997 | Frankl et al. | |
| 5,646,600 A * | 7/1997 | Abdel-Malek et al. | 340/679 |
| 5,750,879 A * | 5/1998 | Ohtsuka et al. | 73/9 |
| 5,966,674 A | 10/1999 | Crawford et al. | |
| 6,208,943 B1 | 3/2001 | Randolph et al. | |
| 6,408,676 B1 | 6/2002 | Stratton et al. | |
| 6,505,517 B1 | 1/2003 | Eryurek et al. | |
| 6,539,315 B1 | 3/2003 | Adams et al. | |
| 6,654,697 B1 | 11/2003 | Eryurek et al. | |
| 6,725,167 B2 | 4/2004 | Grumstrup et al. | |
| 2003/0019297 A1 * | 1/2003 | Fiebelkorn et al. | 73/587 |
| 2003/0216888 A1 * | 11/2003 | Ridolfo | 702/181 |
| 2004/0024568 A1 * | 2/2004 | Eryurek et al. | 702/182 |

OTHER PUBLICATIONS

Fujun He et al. "WPT-SVMs Based Approach for Fault Detection of Valves in Reciprocating Pumps", Proceedings of the American Control Conference, Anchorage, AK, May 8-10, 2002, pp. 4566-4570.

Wang et al., "The Fault Character of the Motors Identified Based on Wavelet Transform", Nov. 2-5, 2003, Proceedings of the Second International Conference on Machine Learning and Cybernetics, Xi'an pp. 2394-2398.

(Continued)

*Primary Examiner*—John Barlow
*Assistant Examiner*—Xiuqin Sun
(74) *Attorney, Agent, or Firm*—Munck Butrus, P.C.

(57) ABSTRACT

A method, apparatus, and computer program are provided for identifying a defective valve. The method, apparatus, and computer program identify one or more indicators of a possible defect in the valve at a plurality of resolution levels. The one or more indicators are identified using at least one of one or more operating characteristics associated with the valve. The method, apparatus, and computer program generate a plurality of indexes associated with the resolution levels, where the indexes are based on the one or more indicators and identify a likelihood of a valve defect. The method, apparatus, and computer program select one of the plurality of resolution levels using at least one of the indexes. The method, apparatus, and computer program determine an overall probability of a valve defect using at least one index associated with the selected resolution level.

27 Claims, 8 Drawing Sheets

OTHER PUBLICATIONS

Mallat et al., "Singularity Detection and Processing with Wavelets", Mar. 1992, IEEE Transactions on Information Theory, vol. 38, No. 2, pp. 617-643.

Jiang Wanlu et al., "Applying Multiresolution Analysis for Processing of Hydraulic Pump Fault Signal", Fifth International Conference on Fluid Power Transmission and Control, Hangzhou, China, Apr. 2001, pp. 1-5.

Simon G. Braun, "The Signature Analysis of Sonic Bearing Vibrations", IEEE Transactions on Sonics and Ultrasonics, vol. SU-27, No. 6, Nov. 1980, pp. 317-328.

Y. Gao et al., "Wavelet-Based Pressure Analysis for Hydraulic Pump Health Diagnosis", Transactions of the ASAE, vol. 46(4), pp. 969-976, 2003.

Horch A, "A Simple Method for Detection of Stiction In Control Valves", Control Engineering Practice, Pergamon Press, Oxford, GB, vol. 7, 1999, pp. 1221-1231.

* cited by examiner

APPARATUS AND METHOD FOR IDENTIFYING POSSIBLE DEFECT INDICATORS FOR A VALVE

CROSS REFERENCE TO RELATED APPLICATIONS

This patent application is related to U.S. patent application Ser. No. 10/717,406 entitled "APPARATUS AND METHOD FOR IDENTIFYING POSSIBLE DEFECT INDICATORS FOR A VALVE" filed on Nov. 19, 2003, which is incorporated by reference.

TECHNICAL FIELD

This disclosure relates generally to process control systems and more specifically to an apparatus and method for identifying defective valves.

BACKGROUND

Processing facilities are typically managed using process control systems. Among other functions, these control systems often manage the use of valves in the processing facilities. The valves typically control the flow of materials in the facilities. Example processing facilities include manufacturing plants, chemical plants, crude oil refineries, and ore processing plants. In these facilities, the valves may control the flow of water, oil, hydrochloric acid, or any other or additional materials in the facilities.

The valves used in the processing facilities often suffer from a number of problems or defects. For example, a valve may suffer from valve hysteresis or valve stiction. Valve hysteresis occurs when the valve is moving in one direction, the control system instructs the valve to move in the opposite direction by a specified amount, and the valve moves in the opposite direction by less than the specified amount. Valve stiction, which is short for static friction, refers to the resistance to the start of motion. It occurs when the valve fails to respond to pressure meant to adjust the opening of the valve. The valve fails to respond until additional pressure is added, which causes the valve to open or close more than desired. These or other defects often limit or prevent the control systems from accurately controlling the flow of materials using the valve.

SUMMARY

This disclosure provides an apparatus and method for identifying defective valves.

In one aspect, a method, apparatus, and computer program identify one or more indicators of a possible defect in the valve at a plurality of resolution levels. The one or more indicators are identified using at least one of one or more operating characteristics associated with the valve. The method, apparatus, and computer program generate a plurality of indexes associated with the resolution levels, where the indexes are based on the one or more indicators and identify a likelihood of a valve defect. The method, apparatus, and computer program select one of the plurality of resolution levels using at least one of the indexes. The method, apparatus, and computer program determine an overall probability of a valve defect using at least one index associated with the selected resolution level.

In particular aspects, the one or more operating characteristics include at least one of measurements of a process variable associated with the operation of the valve and values generated to control the operation of the valve. The one or more indicators include at least one of jumps in the process variable measurements and extreme positions in the generated control values.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
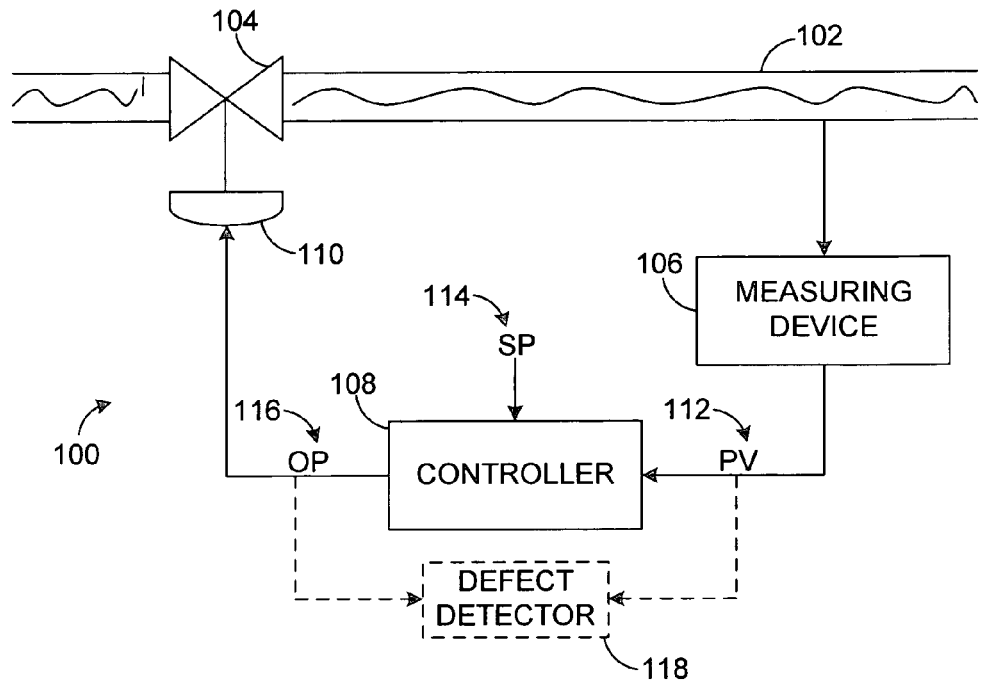
FIG. 1 illustrates an example system for identifying a defective valve according to one embodiment of this disclosure.

FIG. 1 illustrates an example system 100 for identifying a defective valve according to one embodiment of this disclosure. The system 100 shown in FIG. 1 is for illustration only. Other systems may be used without departing from the scope of this disclosure.

In the illustrated example, one or more materials flow through a pipe 102, and the flow of materials through the pipe 102 is controlled by a valve 104. The pipe 102 represents any suitable structure capable of facilitating the transport of one or more materials. The pipe 102 could, for example, represent a steel or plastic pipe or tube capable of facilitating the transport of oil, water, hydrochloric acid, or any other material or materials.

The valve 104 controls the rate at which the material or materials flow through the pipe 102. The valve 104 may, for example, change an opening in the pipe 102, where a larger valve opening allows more material to flow through the pipe 102. The valve 104 includes any structure capable of controlling the flow of one or more materials through a pipe 102.

In the illustrated example, the system 100 includes a measuring device 106, a controller 108, and a valve adjuster 110. The measuring device 106 monitors one or more characteristics associated with the material(s) flowing through the pipe 102. For example, the measuring device 106 may measure the flow rate of a material flowing through the pipe 102. The measuring device 106 could monitor any other or additional characteristics of the material flowing through the pipe 102. The measuring device 106 also outputs a signal 112 to the controller 108, where the signal 112 includes values identifying the measurements made by the measuring device 106. The flow rate or other monitored characteristic may be referred to as a process variable, and the signal 112 provided to the controller 108 may be referred to as a process variable (PV) signal. The measuring device 106 includes any hardware, software, firmware, or combination thereof capable of measuring at least one characteristic of the material flowing through the pipe 102.

The controller 108 controls the opening and the closing of the valve 104 in the system 100. In this example embodiment, the controller 108 uses the process variable signal 112 provided by the measuring device 106 and a set point (SP) 114 to control the valve 104. The set point 114 identifies the desired value for the process variable signal 112. For example, the controller 108 may adjust the valve opening so that the flow rate through the pipe 102 remains at or near a level indicated by the set point 114. Using the process variable signal 112 and the set point 114, the controller 108 generates an output signal (OP) 116 containing output values. The output values indicate the extent to which the valve 104 should be opened. The controller 108 includes any hardware, software, firmware, or combination thereof for controlling the operation of the valve 104. As a particular example, the controller 108 could include one or more software routines stored in at least one memory and executed by at least one processor. Additional details of how the controller 108 controls the valve 104 are provided below.

The valve adjuster 110 uses the values in the output signal 116 to adjust the valve opening or allow the valve 104 to remain in its current position. For example, in some embodiments, the output values in the signal 116 identify the relative amount of change that is needed for the valve 104. In these embodiments, positive values could indicate that the valve 104 should be opened more, negative values could indicate that the valve 104 should be closed more, and zero could indicate that no change is needed. In other embodiments, the output values in the signal 116 identify the absolute position of the valve 104. In these embodiments, a minimum value such as zero could indicate that the valve 104 should be completely closed, a maximum value could indicate that the valve 104 should be completely opened, and a value in between indicates that the valve 104 should be partially opened. The valve adjuster 110 includes any structure capable of opening and/or closing a valve 104.

As described in more detail below, the process variable signal 112 and/or the output signal 116 is used to identify a possible defect in the valve 104. The ability to identify a possible defect in the valve 104 may be implemented within the controller 108 or within a defect detector 118 that resides external to the controller 108. The defect detector 118 includes any hardware, software, firmware, or combination thereof that is capable of identifying possible defects in a valve 104. As a particular example, the defect detector 118 could include one or more software routines stored in at least one memory and executed by at least one processor. The description that follows often describes the controller 108 processing information and identifying a possible defect in a valve 104. The same or similar functionality could also be implemented in the defect detector 118.

The process variable signal 112 and/or the output signal 116 may be used to identify one type or different types of defects in the valve 104. For example, the controller 108 could identify when the valve 104 is suffering from valve hysteresis or valve stiction. Valve hysteresis occurs when the valve 104 is moving in one direction (opening or closing), the controller 108 instructs the valve 104 to move in the opposite direction by a specified amount, and the valve 104 moves in the opposite direction by less than the specified amount. Static friction or "stiction" occurs when the valve 104 fails to respond to pressure from the valve adjuster 110 until additional pressure is applied to the valve 104. At that point, the valve 104 jumps to a larger or smaller opening than desired. These or other defects limit or prevent the controller 108 from accurately controlling the valve 104.

The following description often describes the use of the system 100 in detecting the presence of stiction in the valve 104. This is for ease of illustration and explanation only. The system 100 could use the same or similar techniques to identify other defects in a valve 104. For example, the characteristics of the process variable signal 112 and the output signal 116 could be the same or similar whether the valve 104 is suffering from valve hysteresis or valve stiction. As a result, the system 100 could also be used to identify other defects in the valve 104.

Although FIG. 1 illustrates one example of a system 100 for identifying a defective valve 104, various changes may be made to FIG. 1. For example, the controller 108 could control the operation of any number of valves 104. Also, the valve 104 and the valve adjuster 110 could form a single integral unit.

Figure 2:
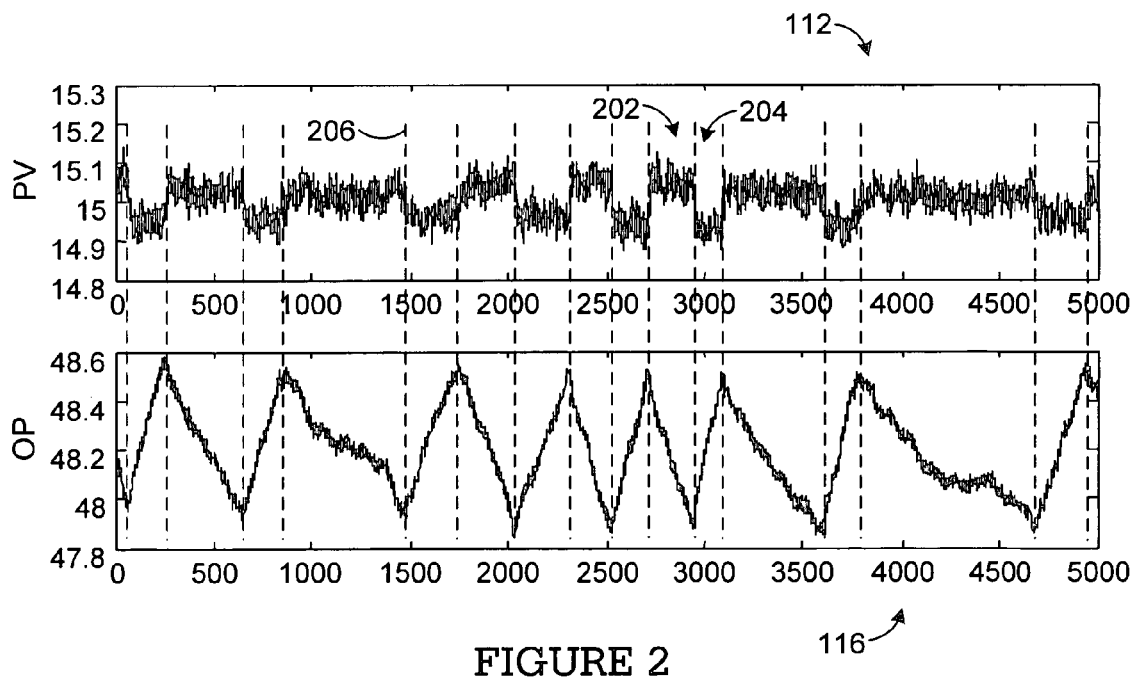
FIG. 2 illustrates example variables used to identify a defective valve according to one embodiment of this disclosure.

FIG. 2 illustrates example variables used to identify a defective valve 104 according to one embodiment of this disclosure. In particular, FIG. 2 illustrates time series of the process variable signal 112 and the associated output signal 116. The time series are collected at a sampling rate of one sample per second, and five thousand data samples are collected for each variable. The time series of the process variable signal 112 and the output signal 116 shown in FIG. 2 are for illustration only. The process variable signal 112 and the output signal 116 could have any suitable values depending on the system 100 in which the controller 108 or defect detector 118 operates.

As shown in FIG. 2, the process variable signal 112 oscillates between time periods 202 having higher measurement values and time periods 204 having lower measurement values. This indicates that the values in the signal 112 are oscillating around the set point 114 used by the controller 108. Also, as shown in FIG. 2, the values in the output signal 116 generally decrease during time periods 202 and generally increase during time periods 204. This indicates that the values in the output signal 116 constantly wander between high and low peak values.

As described below, the process variable signal 112 and the output signal 116 are used to identify a valve 104 that may be or that is defective. For example, the behavior of the process variable signal 112 and the output signal 116 shown in FIG. 2 may indicate that the valve 104 is suffering from stiction or other defect.

Stiction often involves two phases, a "stick" phase and a "slip" phase. The stick phase occurs when the valve adjuster 110 applies force to the valve 104 and the valve 104 sticks or does not move (open or close). This causes the controller 108 to instruct the valve adjuster 110 to apply additional force to the valve 104. The slip phase occurs when the valve 104 finally slips or moves, but the additional force applied by the valve adjuster 110 causes the valve 104 to open or close more than desired.

In FIG. 2, multiple lines 206 indicate times when the valve 104 slips. In other words, the lines 206 identify when the opening in the valve 104 changes more than desired. In general, the area around a line 206 represents the slip phase of the valve 104, and the area between two lines 206 represents the stick phase of the valve 104.

The presence of stiction may explain the behavior of the process variable signal 112 and the output signal 116. When in the stick phase, the process variable signal 112 seems to remain centered at a relatively constant value, and the output signal 116 is increasing or decreasing. At this point, the process variable signal 112 indicates, for example, that the flow rate of material through the pipe 102 is remaining relatively constant. The increasing or decreasing output signal 116 indicates that the controller 108 is instructing the valve adjuster 110 to apply more and more force to the valve 104.

When in the slip phase, the process variable signal 112 jumps (lower values to higher values or vice versa), and the output signal 116 switches direction (increasing to decreasing or vice versa). The jump in the process variable signal 112 indicates, for example, that the flow rate of material through the pipe 102 has changed by a relatively large amount. This may be caused by the application of enough force to overcome valve stiction, but the amount of force was excessive and caused the valve 104 to open or close more than desired. The change in direction of the output signal 116 indicates that the controller 108 has begun instructing the valve adjuster 110 to change the valve opening in the other direction to compensate for the larger than expected change in the flow rate.

As a particular example, during a time period 202 when the process variable signal 112 is higher, this may indicate that the flow rate through the pipe 102 is too high. The controller 108 attempts to decrease the valve opening to reduce the flow rate, but stiction causes the valve 104 to retain its current amount of opening. This causes the controller 108 to instruct the valve adjuster 110 to apply more and more force to the valve 104, which is indicated by the falling output signal 116. Eventually, enough force is applied to the valve 104 and the valve opening changes, but the excessive force causes the valve opening to decrease more than desired. This leads to the following time period 204 where the process variable signal 112 is lower, which may indicate that the flow rate through the pipe 102 is now too low. This causes the controller 108 to instruct the valve adjuster 110 to increase the valve opening. Stiction causes the valve 104 to retain its current amount of opening, which causes the controller 108 to instruct the valve adjuster 110 to apply more and more force to the valve 104. This is indicated by the rising output signal 116.

Although FIG. 2 illustrates one example of the variables used to identify a defective valve 104, various changes may be made to FIG. 2. For example, any suitable values may form the process variable signal 112 and the output signal 116. Also, the variables could be sampled at any suitable sampling rate that can reveal valve stiction using the sampled data. In addition, additional variables could be used to control the valve 104 and/or to identify a defective valve 104.

Figure 3A:
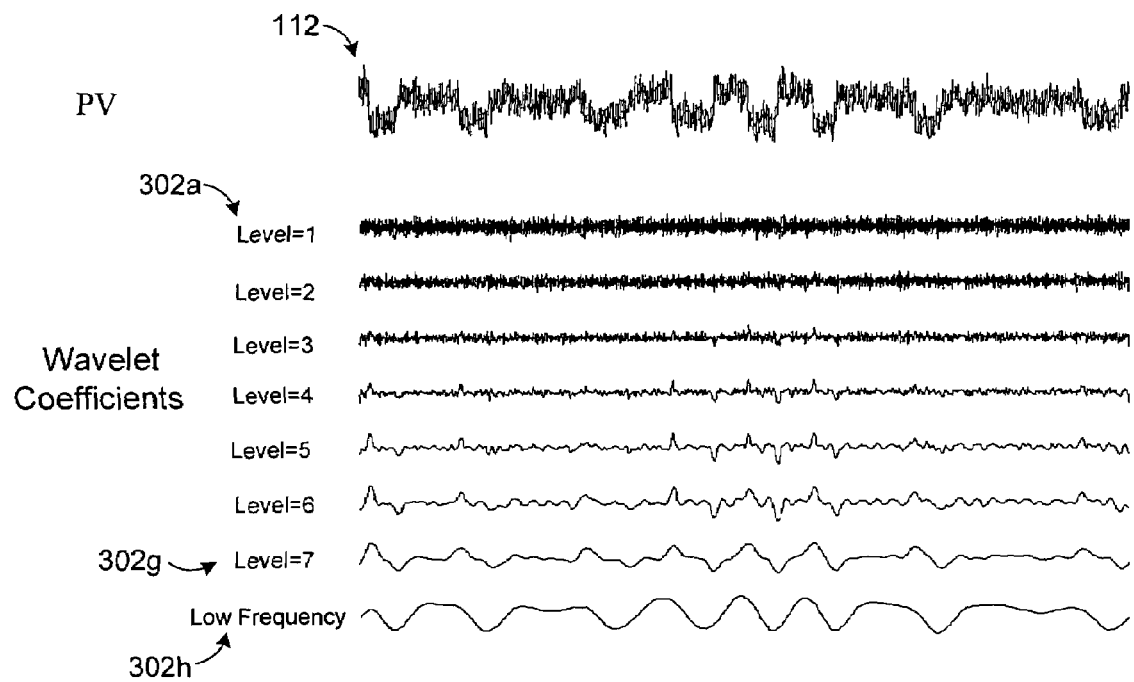
FIGS. 3A and 3B illustrate example indications of a defective valve according to one embodiment of this disclosure.
Figure 3B:
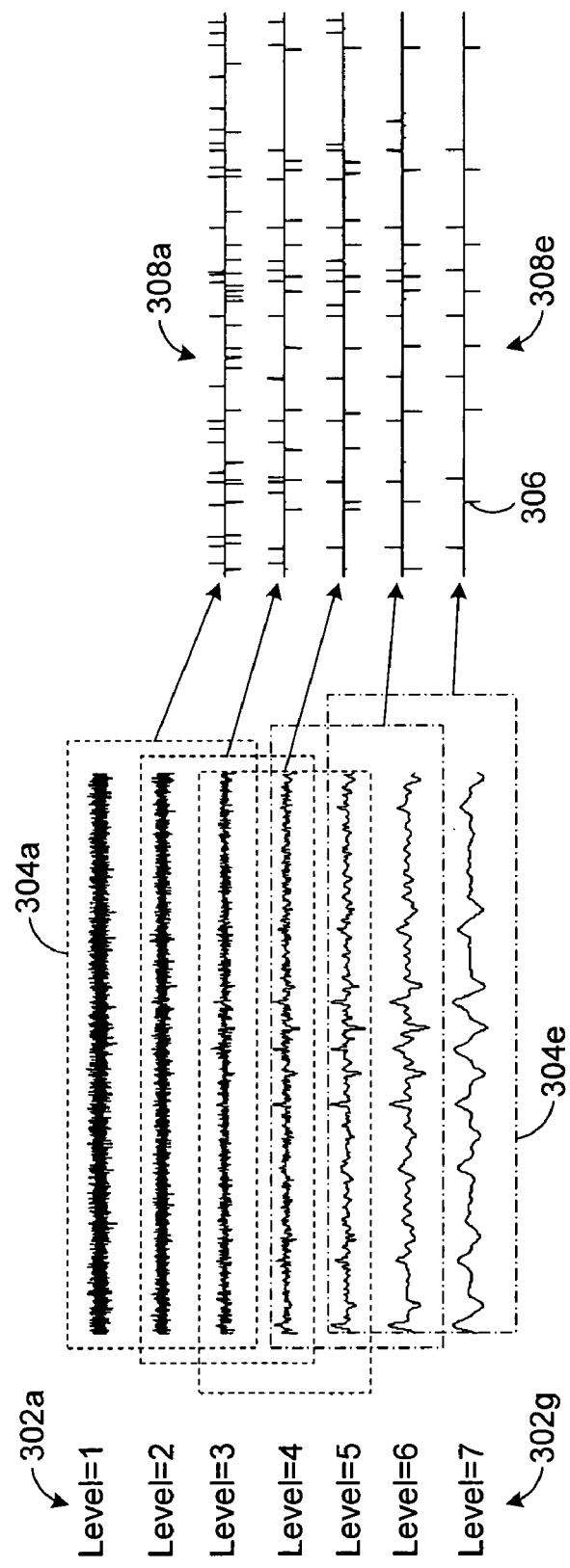

FIGS. 3A and 3B illustrate example indications of a defective valve 104 according to one embodiment of this disclosure. In particular, FIGS. 3A and 3B illustrate an example wavelet decomposition used to identify jumps in the process variable signal 112. The indications shown in FIGS. 3A and 3B are for illustration only. Other indications of a defective valve 104 may be used without departing from the scope of this disclosure.

As shown in FIG. 3A, the process variable signal 112 is received by the controller 108. The controller 108 performs wavelet decomposition to generate wavelet coefficients at multiple resolution levels 302a-302g, plus low frequency content at level 302h. Each of the resolution levels 302a-302g represents different information of the process variable signal 112. In particular, each of the levels 302a-302g represents changes in the process variable signal 112. The higher levels (starting at level 302a) represent higher-frequency changes in the process variable signal 112, and the lower levels (starting at level 302g) represent lower-frequency changes in the process variable signal 112.

The controller 108 uses any suitable technique to generate the redundant wavelet coefficients in the resolution levels 302a-302g. In some embodiments, the controller 108 uses a Discrete Dyadic Wavelet Transform (DDWT) to generate the wavelet coefficients. While FIG. 3A illustrates the generation of wavelet coefficients at seven different resolution levels 302a-302g, the controller 108 could generate wavelet coefficients at any number of levels.

The wavelet coefficients in the different resolution levels 302a-302g are related. The controller 108 uses these relationships to identify possible jumps in the process variable signal 112. As shown in FIG. 3B, the controller 108 groups the wavelet coefficients at different resolution levels 302a-302g into groups 304a-304e. In this example, each of the groups 304a-304e includes three adjacent resolution levels of wavelet coefficients. In other embodiments, the controller 108 could group any number of resolution levels into any number of groups.

Using the groups 304a-304e, the controller 108 identifies possible process variable jumps 306 at different resolution levels 308a-308e. Each jump 306 represents a possible location where the process variable signal 112 changes or jumps by a relatively large amount. As a result, each jump 306 represents a possible occurrence of the slip phase of a stiction event.

The controller 108 uses any suitable technique to identify the possible jumps 306 at the resolution levels 308a-308e. In some embodiments, the controller 108 uses singularity detection on the groups 304a-304e to identify the jumps 306 at the resolution levels 308a-308e.

As shown in FIG. 3B, the higher resolution levels (starting at level 308a) identify more jumps 306 than the lower resolution levels (starting at level 308e). Because the resolution levels 308a-308e identify different numbers of process variable jumps 306, each of the resolution levels 308a-308e could indicate different amounts of stiction occurring in the valve 104.

In this example, there are many false jumps 306 identified in the higher resolution levels (starting at level 308a) due to significant high-frequency noise contained in the example signal 112. In this case, the jumps 306 identified at lowest resolution level 308e are most accurate. However, the most accurate resolution level may not always be the lowest resolution level 308e. This is because different process variable signals 112 could have different noise, drift, and oscillation behavior. It is also possible that the stiction experienced by a valve 104 is constant or intermittent. These factors may cause different ones of the resolution levels 308a-308e to more accurately represent the pattern of stiction in the valve 104. As a particular example, some of the higher resolution levels may include false jumps 306, and some of the lower resolution levels may lose jumps 306 due to smoothing effects. One technique for selecting the most accurate of the resolution levels 308a-308e is described below.

Although FIGS. 3A and 3B illustrate one example of the indications of a defective valve 104, various changes may be made to FIGS. 3A and 3B. For example, wavelet coefficients at any number of resolution levels 302a-302g could be produced. Also, any number of groups 304a-304e could include any number of resolution levels 302a-302g. In addition, jumps 306 in any number of resolution levels 308a-308e could be identified.

Figure 4:
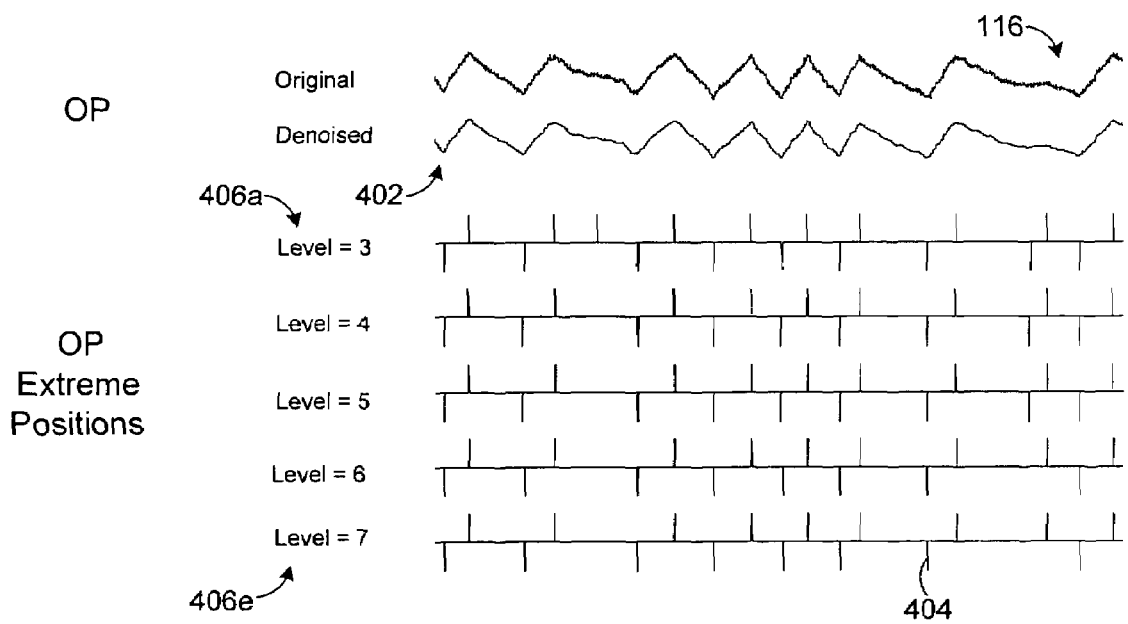
FIG. 4 illustrates additional example indications of a defective valve according to one embodiment of this disclosure.

FIG. 4 illustrates additional example indications of a defective valve 104 according to one embodiment of this disclosure. In particular, FIG. 4 illustrates how extreme positions in the output signal 116 produced by the controller 108 are identified. The example indications shown in FIG. 4 are for illustration only. Other indications of a defective valve 104 may be used without departing from the scope of this disclosure.

As shown in FIG. 4, the output signal 116 constantly wanders between high and low peaks. The high and low peaks may be referred to collectively as extreme positions. The presence of an extreme position in the output signal 116 may indicate the occurrence of the slip phase of a stiction event.

The controller 108 may process the original output signal 116 or a filtered or "denoised" version 402 of the output signal. The controller 108 uses any suitable technique to identify the extreme positions in the output signal 116. For example, the controller 108 could classify a particular position in the output signal 116 as an extreme position if it satisfies either of the conditions:

$$OP(position) \geq \max(OP(position \pm range)) \quad (1)$$

OR $$OP(position) \leq \min(OP(position \pm range)) \quad (2)$$

where OP(position) refers to the particular position in the output signal 116, and range defines an area around the particular position. In these embodiments, the particular position represents an extreme position if it has a value greater than or less than all other values falling within the range around that particular position.

The controller 108 could use any suitable technique for identifying the range used to identify extreme positions. In some embodiments, the controller 108 identifies the locations of extreme positions 404 at different resolution levels 406a-406e. In these embodiments, the controller 108 identifies a range value for each of the resolution levels 406a-406e. In particular embodiments, the controller 108 identifies the range values for the resolution levels 406a-406e using the formula:

$$Range_k = \frac{TotalDataLength}{PV\ Jumps_k} \quad (3)$$

where $Range_k$ represents the range value corresponding to the kth resolution level 406a-406e, TotalDataLength represents the total number of samples in the output signal 116, and $PVJumps_k$ represents the total number of process variable jumps 306 detected in the kth resolution level 308a-308e shown in FIG. 3B.

The extreme positions 404 may be identified at multiple resolution levels 406a-406e. As described above, the most accurate level may not always be the lowest resolution level 406e. One technique for selecting the most accurate of the resolution levels 406a-406e is described below.

Although FIG. 4 illustrates an additional example of indications of a defective valve 104, various changes may be made to FIG. 4. For example, the extreme positions 404 may be detected at any number of resolution levels using corresponding $PVJumps_k$ detected at those resolution levels.

Also, the extreme positions 404 may be detected using the original output signal 116 or the filtered output signal 402.

Figure 5:
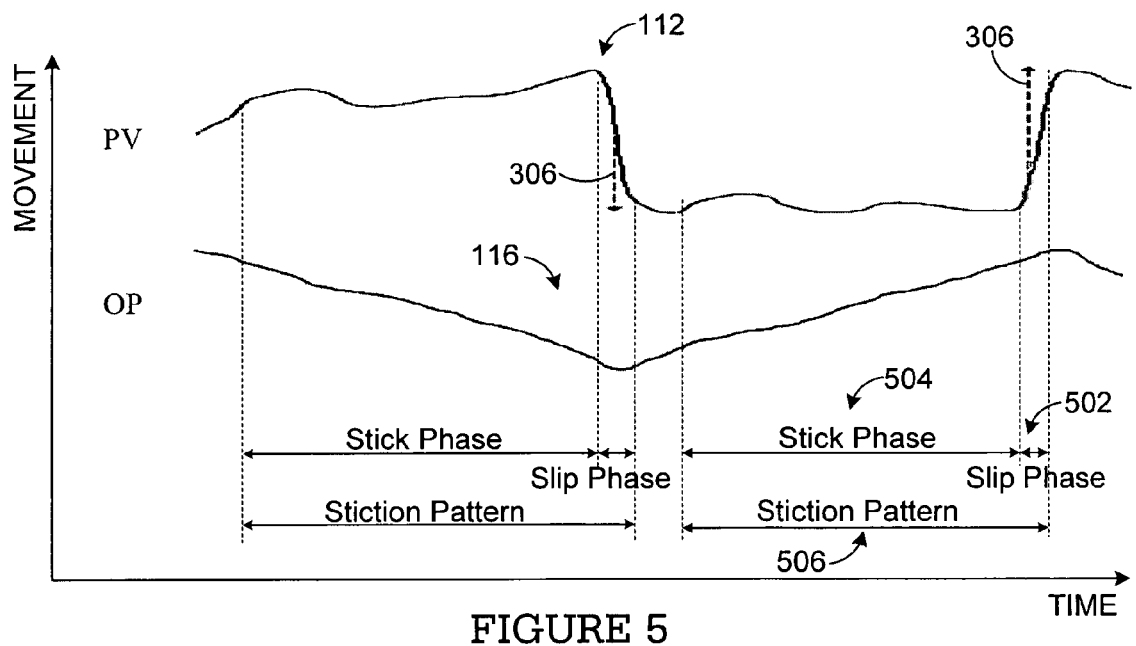
FIG. 5 illustrates example stiction patterns according to one embodiment of this disclosure.

FIG. 5 illustrates example stiction patterns according to one embodiment of this disclosure. The patterns shown in FIG. 5 are for illustration only. Other patterns may be generated and processed without departing from the scope of this disclosure.

As described above, process variable jumps 306 in the process variable signal 112 and/or extreme positions 404 in the output signal 116 may be detected at one or multiple resolution levels. Using the jumps 306 and/or the extreme positions 404, the controller 108 identifies the pattern of stiction for each of the resolution levels. In some embodiments, a stiction pattern includes a slip phase 502 and a preceding stick phase 504. The controller 108 uses the jumps 306 and/or the extreme positions 404 as reference points to identify the slip phases 502 and the stick phases 504. A slip phase 502 and the preceding stick phase 504 collectively form a stiction pattern 506.

The controller 108 uses any suitable technique for identifying the stiction patterns 506. In some embodiments and as shown in FIG. 5, the controller 108 identifies a process variable jump 306 and local minimum and local maximum values around the jump 306. The controller 108 also calculates a "process variable change" as the local maximum value minus the local minimum value. The controller 108 further identifies a slip phase 502 as the smallest region around the jump 306 that includes a specified percentage of the process variable change, such as eighty five percent. In addition, the controller 108 identifies a stick phase 504 as the largest region preceding the slip phase 502 that occupies less than a specified percentage of the process variable change, such as twenty percent. This produces one stiction pattern 506.

In other embodiments, the controller 108 identifies the average length of the stiction patterns 506 using the formula:

$$AverageLength = \frac{TotalDataLength}{NumberOPExtremes} \quad (4)$$

where AverageLength represents the average length of the stiction patterns 506, TotalDataLength represents the total number of samples in the output signal 116, and NumberOPExtremes represents the number of extreme positions 404 in the output signal 116. For each extreme position 404, the controller 108 then defines the stick phase 504 as the region preceding an extreme position 404 having a specified portion of the average length, such as seventy five percent of the average length. The controller 108 further defines the slip phase 502 as the region after an extreme position 404 having a specified portion of the average length, such as twenty five percent of the average length. This produces one stiction pattern 506.

When the process variable jumps 306 and the output signal extreme positions 404 are produced at multiple resolution levels, the controller 108 could identify the stiction patterns 506 for each resolution level. Also, as described below, the stiction patterns 506 are used to calculate one or more indexes, which are used to identify the probability that a valve 104 is suffering from stiction or other defect.

Although FIG. 5 illustrates one example of stiction patterns 506, various changes may be made to FIG. 5. For example, the stiction patterns 506 may be produced in any suitable manner.

Figure 6C:
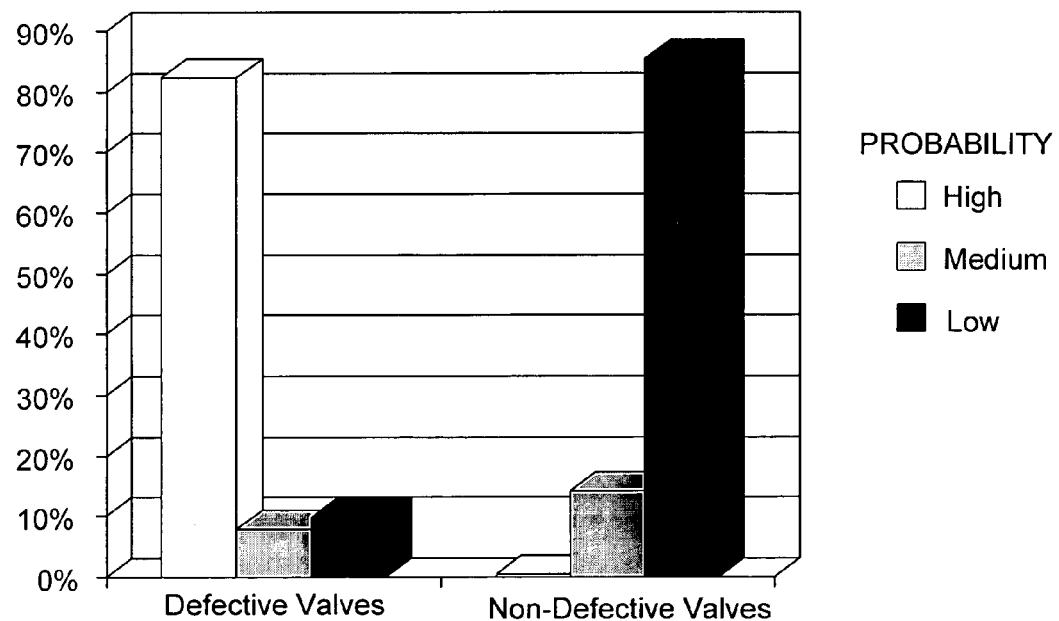
FIGS. 6A through 6C illustrate example probability classifications indicating whether valves are defective according to one embodiment of this disclosure.
Figure 6A:
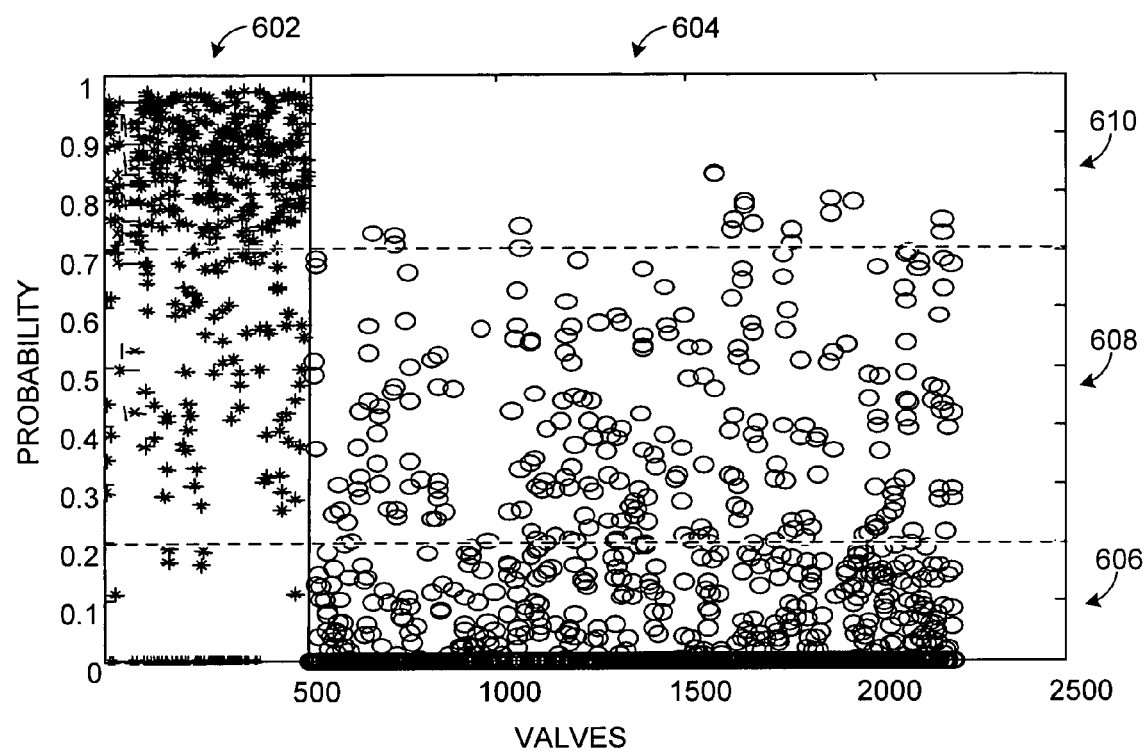
Figure 6B:
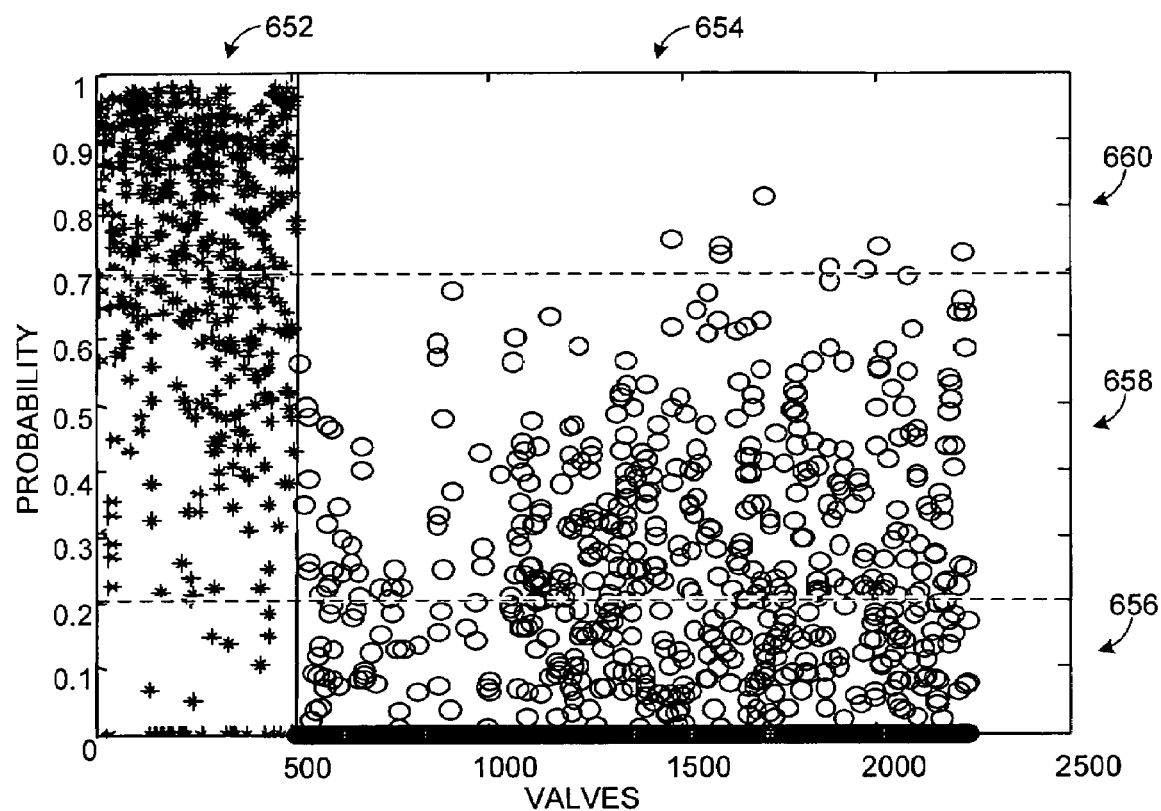

FIGS. 6A through 6C illustrate example probability classifications indicating whether valves 104 are defective according to one embodiment of this disclosure. The probability classifications shown in FIGS. 6A through 6C are for illustration only. Other probability classifications could be used without departing from the scope of this disclosure.

As described above, the controller 108 uses the process variable jumps 306, the output signal extreme positions 404, or both to generate stiction patterns 506. FIG. 6A illustrates the probabilities that valves 104 are defective based on the process variable jumps 306, and FIG. 6B illustrates the probabilities that valves 104 are defective based on the controller output signal extreme positions 404. FIG. 6C shows the probability classifications produced using both the process variable jumps 306 and the output signal extreme positions 404.

The controller 108 uses the stiction patterns 506 to calculate one or more indexes, which are used to identify the probability that a valve 104 is suffering from stiction or other defect. The controller 108 may generate any suitable index or indexes. The following are example indexes that could be calculated, although any other or additional indexes could be produced and used by the controller 108.

A stick/slip PV movement ratio represents the average absolute PV movements in the stick phases 504 divided by the average absolute PV movements in the slip phases 502. When valve stiction occurs, the PV movement is typically larger in the slip phases 502 and smaller in the stick phases 504. As a result, a smaller stick/slip PV movement ratio indicates a higher probability that the valve 104 is suffering from a defect.

A slip/stick duration ratio represents the average duration of the slip phases 502 divided by the average duration on the stick phases 504. When valve stiction occurs, the stick phases 504 are often longer than the slip phases 502. As a result, a smaller slip/stick duration ratio indicates a higher probability that the valve 104 is suffering from a defect.

A stick/slip PV/OP gain ratio represents the ratio of the "stick phase gain" to the "slip phase gain." The stick phase gain represents the average of the absolute PV movements divided by the average of the absolute OP movements in the stick phases 504. The slip phase gain represents the average of the absolute PV movements divided by the average of the absolute OP movements in the slip phases 502. When valve stiction occurs, the stick phases 504 often include lesser PV movements and larger and consistent OP movements, so the stick phase gain should be smaller. The slip phases 502 often include larger sudden PV movements, so the slip phase gain should be larger. Smaller PV/OP gain ratios indicate higher probabilities of a valve defect.

A number of stiction features value represents the total number of stiction patterns 506 identified. A larger number of stiction features within a given amount of time often indicates a higher likelihood of a valve defect. A standard deviation of OP movements in the stick phases 504 could also be used. When valve stiction occurs, the OP movements in the stick phases 504 may be relatively consistent, so smaller standard deviations may indicate higher probabilities that a valve 104 is defective.

A stiction feature ratio represents the duration of the total stiction patterns 506 divided by the total duration of the collected data. For example, the controller 108 may be unable to determine whether particular portions of the collected data represent a stiction pattern 506. As a particular example, the controller 108 could determine that the stiction patterns 506 occupy seventy percent of the total duration, so the stiction feature ratio is 0.7. Larger stiction feature ratios may indicate higher probabilities of a valve defect.

A standard deviation of the process gain could be calculated. In each stiction pattern 506, the process gain represents the PV movement in the slip phase 502 divided by the OP movement in stick phase 504. When valve stiction occurs, the process gains calculated from the extracted stiction patterns 506 may be relatively consistent. A smaller standard deviation in the calculated process gains therefore represents a larger likelihood of a valve defect.

A PV jump/OP extreme position ratio represents the number of PV jumps 306 divided by the number of OP extreme positions 404. The likelihood of a valve defect increases as the PV jump/OP extreme position ratio approaches a value of one.

A PV jump and OP extreme position consistency value represents the average difference in time between the detected OP extreme positions 404 and the detected PV jumps 306, divided by the average duration of the stiction patterns 506. Larger probabilities of a valve defect may correspond to smaller consistency values.

These indexes may be weighted differently and used to produce an overall probability that a defect exists. For example, the stick/slip PV movement ratio may be more useful in identifying stiction than the stiction feature ratio, so the PV jump/OP extreme position ratio is given a higher weight.

In particular embodiments, the PV jumps 306 and the OP extreme positions 404 are identified at multiple resolution levels. In these embodiments, one or more indexes may be generated at each resolution level. The probability of a defect can be calculated as a function of the indexes, such as using the formula:

$$P(k) = F(\text{Index}(k)) \qquad (5)$$

where P(k) represents the probability associated with the kth resolution level and Index(k) represents the values of the indexes produced for the kth resolution level. The function of the indexes could represent any of a wide variety of standard or proprietary functions.

In particular embodiments, the probability of a defect may be calculated as a weighted sum of the indexes using the formula:

$$P(k) = (\text{Index}(k))^T * W + b \qquad (6)$$

where Index(k) represents an array of the indexes for the kth resolution level, $(\text{Index}(k))^T$ represents the transpose of the array, W represents an array of weights for the indexes, and b represents a bias term. To ensure that the probability has a value between zero and one inclusive, the probability could be determined using the formula:

$$P(k) = \frac{1}{(1 + \exp^{-((\text{Index}(k))^T * W + b)})}. \qquad (7)$$

Depending on the formula used to determine the probability, values for the weights W may be selected in any suitable manner, such as by specifying the weights by experience or performing regression to calculate the weights.

To make the results more accurate, a nonlinear relationship of the indexes and the probability may be included in the probability calculation. For example, if there is only one stiction pattern 506 detected over a long time period, the probability should be small no matter how favorable other indexes are for producing a high stiction probability. This is due to the fact that the pattern did not repeat. This or other examples may be freely incorporated as nonlinear relationships between the probability and one or more of the indexes.

The probabilities calculated using one or more of Equations (5)-(7) are used to select the best resolution level. The best resolution level represents one of the resolution levels 308a-308e and/or one of the resolution levels 406a-406e, and the selected resolution level is used to identify the overall probability that a valve 104 is defective.

As described above, the controller 108 uses any suitable technique for identifying the stiction patterns 506. One technique involves using the process variable jumps 306, and another technique involves using the output signal extreme positions 404. In particular embodiments, the controller 108 uses one or both techniques to generate one or multiple sets of stiction patterns 506. When both techniques are used to generate multiple sets of stiction patterns 506, the overall probability of a defect may be calculated using the formulas:

$$Pr_{PV}=\text{Max}(F_{PV}(\text{index}_{PV}(\text{level}))) \quad (8)$$

$$Pr_{OP}=\text{Max}(F_{OP}(\text{index}_{OP}(\text{level}))) \quad (9)$$

$$\text{Overall}=F(PR_{PV}, PR_{OP}). \quad (10)$$

where:

$Pr_{PV}$ represents the probability of stiction calculated using the stiction patterns 506 produced with the process variable jumps 306 (such as those stiction patterns 506 produced using the technique described in Paragraph [053]);

$Pr_{OP}$ represents the probability of stiction calculated using the stiction patterns 506 produced with the extreme positions 404 (such as those stiction patterns 506 produced using the technique described in Paragraph [054]);

$\text{index}_{PV}$ represents the indexes calculated using the stiction patterns 506 produced with the process variable jumps 306;

$\text{index}_{OP}$ represents the indexes calculated using the stiction patterns 506 produced with the extreme positions 404;

level represents the resolution level at which the process variable jumps 306 or the OP extreme positions 408 are identified;

$F_{PV}$ and $F_{OP}$ represent the functions used to calculate the probability from the indexes as described above; and Overall represents the overall probability that a valve 104 is defective.

In this example, the two valve stiction probabilities are calculated by using the process variable jumps 306 and the OP extreme positions 404 at the resolution level that has the larger probability value. The overall probability of a valve defect is then calculated as a function of the two stiction probabilities.

In particular embodiments, the overall probability Overall is calculated using the following conditions (where | means or, & means and, y1 represents $Pr_{PV}$, y2 represents $Pr_{OP}$, and y represents Overall):

```
if (y1 >=0.7 | y2 >=0.7) then
    y=max(y1,y2);
elseif (y1 >=0.6 & y2 >= 0.6) then
    y= 0.7;
elseif (y1 >= 0.6 & y2 > 0.2) then
    y=max(y1,y2);
elseif (y2 >=0.6 & y1 > 0.2) then
    y=max(y1,y2);
elseif (y1 >=0.5 | y2 >=0.5) then
    y=min(0.6,((y1-0.2)/0.8+(y2-
        0.2)/0.8));
elseif (y1 <=0.2 | y2 <=0.2) then
    y=0;
else
    y=min(0.6,(min(0.5,max(0,(y1-
        0.2)/0.8))+min(0.5,max(0,(y2-
        0.2)/0.8))));
end
```

This represents one possible technique for identifying the overall probability of a valve defect. Other techniques could also be used.

In other embodiments, the controller 108 may use either the process variable jumps 306 or the output signal extreme positions 404 to generate a single set of stiction patterns 506 on each resolution level. In these embodiments, the overall probability of a valve defect may be calculated using either Equation (8) or Equation (9).

FIG. 6A illustrates the overall probabilities of a valve defect calculated using Equation (8) (combined with Equation (7) and nonlinear processing of the indexes as described above). The PV signal 112 and the OP signal 116 used in this example were collected from various real operational processes. Over two thousand datasets were collected that are associated with more than one thousand valves 104. Approximately five hundred datasets are associated with defective valves 104, and approximately seventeen hundred datasets are associated with non-defective valves 104. The datasets are all collected at a sampling rate of one sample per second, and each dataset contains one hour of data for the PV signal 112 and OP signal 116.

In this example, FIG. 6A is divided into a first portion 602 and a second portion 604. The first portion 602 identifies the probabilities calculated for valves 104 that suffer from a defect, and the second portion 604 identifies the probabilities calculated for valves 104 that do not suffer from a defect.

In FIG. 6A, the calculated probabilities are divided into three classifications 606-610. The class 606 represents lower probabilities of a defect, the class 608 represents intermediate probabilities of a defect, and the class 610 represents higher probabilities of a defect. As shown in FIG. 6A, a majority of the probabilities for the defective valves 104 in the first portion 602 fall within the highest class 610, and almost all of the probabilities fall within the higher two classes 608-610. Similarly, many of the probabilities for the non-defective valves 104 in the second portion 604 fall within the lowest class 606, and almost all of the probabilities fall within the lower two classes 606-608.

FIG. 6B illustrates the overall probabilities of a valve defect calculated using Equation (9) (combined with Equation (7) and nonlinear processing of the indexes as described above). The datasets are the same as those used in FIG. 6A.

In this example, FIG. 6B is divided into a first portion 652 and a second portion 654. The first portion 652 identifies the probabilities calculated for valves 104 that suffer from a defect, and the second portion 654 identifies the probabilities calculated for valves 104 that do not suffer from a defect. The probabilities are also divided into three classifications 656-660. The class 656 represents lower probabilities of a defect, the class 658 represents intermediate probabilities of a defect, and the class 660 represents higher probabilities of a defect.

As shown in FIG. 6B, a majority of the probabilities for the defective valves 104 in the first portion 652 fall within the highest class 660, and almost all of the probabilities fall within the higher two classes 658-660. Similarly, many of the probabilities for the non-defective valves 104 in the second portion 654 fall within the lowest class 656, and almost all of the probabilities fall within the lower two classes 656-658.

As shown in FIGS. 6A and 6B, using only the process variable jumps 308 or only the output signal extreme positions 404, the controller 108 classifies the probabilities of a defect into the extreme classes (highest for defective valves 104 and lowest for non-defective valves 104) correctly for many of the valves 104. Also, the controller 108 rarely classifies the probability of stiction into the wrong extreme class (lowest for defective valves 104 and highest for non-defective valves 104).

For probabilities falling into the intermediate classes, it may be difficult to determine whether or not those valves 104 are defective. To help reduce the number of probabilities falling into the intermediate classes, the controller 108 uses both the process variable jumps 308 and the output signal extreme positions 404. Also, different stiction pattern extraction techniques can be applied to the process variable jumps 308 and the OP signal extreme positions 404. In this way, the controller 108 more accurately classifies the stiction probabilities for the defective and non-defective valves 104. As shown in FIG. 6C, when using both characteristics, the controller 108 correctly classifies the probabilities for defective valves 104 and the probabilities for non-defective valves 104 in most cases. Also, the controller 108 reduces the number of probabilities falling within the intermediate classes.

The various classes 606-610 and 656-660 may be defined in any suitable manner. For example, FIGS. 6A and 6B illustrate that the lower classes 606, 656 range between zero and 0.2, the intermediate classes 608, 658 range between 0.2 and 0.7, and the higher classes 610, 660 range between 0.7 and 1.0. The classes could be defined using any other suitable criteria.

Although FIGS. 6A through 6C illustrate one example of the probability classifications indicating whether a valve 104 is defective, various changes may be made to FIGS. 6A through 6C. For example, the various probabilities and the classifications of those probabilities are for illustration only and depend on the particular valves 104 being monitored. Other probabilities and classifications could be produced. As a particular example, depending on the noise and drift content in the data, the controller 108 could more accurately classify the probabilities as high or low and not in the intermediate range.

Figure 7:
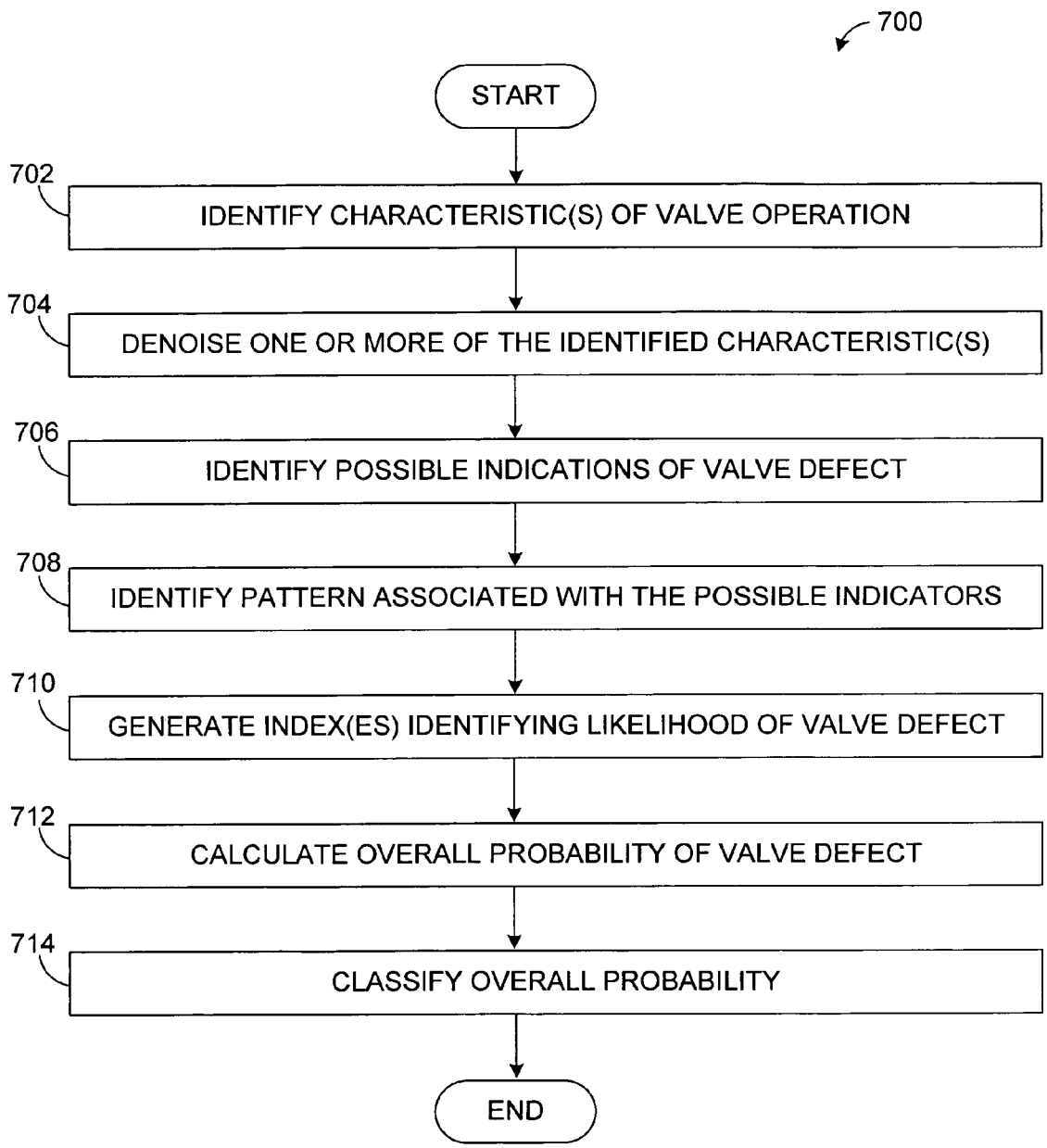
FIG. 7 illustrates an example method for identifying a defective valve according to one embodiment of this disclosure.

FIG. 7 illustrates an example method 700 for identifying a defective valve 104 according to one embodiment of this disclosure. For ease of illustration and explanation, the method 700 is described with respect to the system 100 of FIG. 1. The method 700 could be used by any other suitable system.

One or more characteristics associated with the operation of a valve 104 are identified at step 702. This may include, for example, the controller 108 receiving and storing the process variable signal 112 produced by the measuring device 106. This may also include the controller 108 storing the output signal 116 previously produced by the controller 108.

One or more of the identified characteristics are filtered or denoised at step 704. This may include, for example, the controller 108 filtering the process variable signal 112 and/or the output signal 116.

Possible indications of a valve defect are identified at step 706. This may include, for example, the controller 108 identifying one or more process variable jumps 306 at one or multiple resolution levels. This may also include the controller 108 identifying one or more output signal extreme positions 404 at one or multiple resolution levels.

Patterns associated with the possible defect indicators are identified at step 708. This may include, for example, the controller 108 analyzing the identified process variable jumps 306 and/or the output signal extreme positions 404. This may also include the controller 108 generating one or more sets of stiction patterns 506 for each of the resolution levels.

One or more indexes are generated at step 710. This may include, for example, the controller 108 generating one or more indexes for each resolution level. An overall probability of a valve defect is generated at step 712. This may include, for example, the controller 108 using the indexes produced at step 710 to identify the most accurate resolution level. This may also include the controller 108 using the indexes associated with the most accurate resolution level to generate the overall probability of defect for the valve 104.

The overall probability of a defect is classified at step 714. This may include, for example, the controller 108 determining whether the overall probability falls into a high, intermediate, or low probability class. At this point, the controller 108 or the system 100 may take any other suitable action. For example, when a high overall probability is detected, the controller 108 could inform a technician that the valve 104 needs servicing.

Although FIG. 7 illustrates one example of a method 700 for identifying a defective valve 104, various changes may be made to FIG. 7. For example, the controller 108 need not denoise the characteristics at step 704. Also, the controller 108 could perform adaptive denoising for the PV signal 112 and OP signal 116 at each resolution level between steps 706 and 708. The denoised versions of the PV signal 112 and the OP signal 116 are used for stiction pattern extraction and index calculation at each resolution level. As a particular example, the denoising may be done differently for stiction pattern extraction and index calculation at different resolution levels, such as when less denoising or filtering is done for higher resolution levels and more denoising or filtering is done for lower resolution levels. In addition, the controller 108 could perform stiction pattern verification between steps 708 and 710, where falsely identified stiction patterns may be excluded from the index calculation.

Figure 8:
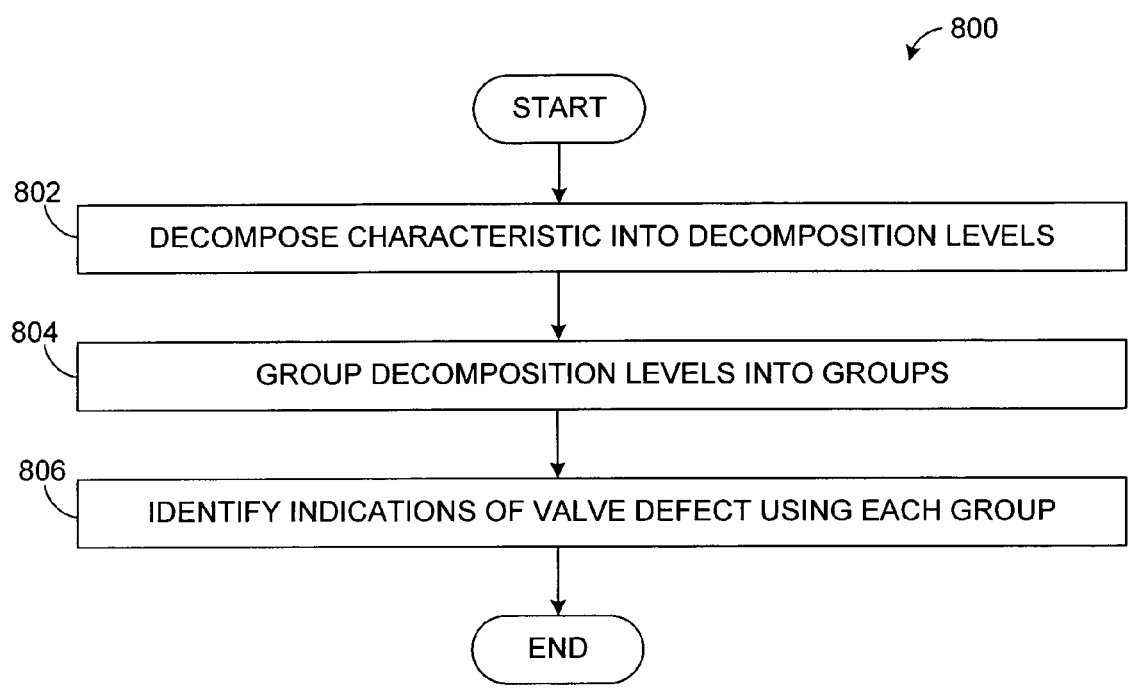
FIG. 8 illustrates an example method for identifying indications of a defective valve according to one embodiment of this disclosure.

FIG. 8 illustrates an example method 800 for identifying possible indications of a defective valve 104 according to one embodiment of this disclosure. For ease of illustration and explanation, the method 800 is described with respect to the system 100 of FIG. 1. The method 800 could be used by any other suitable system.

A monitored characteristic is decomposed into multiple decomposition or resolution levels at step 802. This may include, for example, the controller 108 performing wavelet decomposition to decompose the process variable signal 112 and produce wavelet coefficients at multiple resolution levels 302a-302g.

The decomposition or resolution levels are grouped into multiple groups at step 804. This may include, for example, the controller 108 grouping the wavelet coefficients in different resolution levels 302a-302g into two or more groups 304a-304e. In particular embodiments, the groups 304a-304e overlap, where each group contains wavelet coefficients at three adjacent resolution levels.

The groups of decomposition or resolution levels are used to identify indications of a valve defect at step 806. This may include, for example, the controller 108 performing singularity detection using the groups 304a-304e to identify process variable jumps 306 at multiple resolution levels 308a-308e.

The following represents one technique for identifying PV jumps 306 using singularity detection. In particular, the following describes the use of the discrete dyadic wavelet transform. Other techniques could also be used. The controller 108 groups wavelet coefficients from a fixed number of adjacent resolution levels 302 (in the example in FIG. 3B, groups of three). The controller 108 then performs singularity detection to detect a PV jump 306 using the group of wavelet coefficients.

As a particular example, assume that the controller 108 is attempting to identify a PV jump 306 using wavelet coefficients from resolution levels L, L-1, and L-2. The controller 108 may identify a PV jump 306 at resolution level L if all three of the following conditions are met:

$W\_PV(p,L)$ is a local maximum/minimum point;     Condition 1

$0.7 < W\_PV(p,L)/W\_PV(p,L-1) < 2$; and     Condition 2

$0.6 < W\_PV(p,L)/W\_PV(p,L-2) < 4$;     Condition 3 where $W\_PV(p,L)$ represents the wavelet coefficient at position p in resolution level L. The values of 0.6, 0.7, 2, and 4 could be replaced by any suitable values. For example, 0.6 and 0.7 could be replaced by any values less than one, and two and four could be replaced by any values greater than one, depending on the general characteristics of the valve 104. In this example, the value $W\_PV(p,L)$ may represent a local maximum/minimum point when either of the following conditions is met:

$W\_PV(p,L)>0$ and $W\_PV(p,L)>W\_PV(p-1,L)$ and $W\_PV(p,L)>W\_PV(p+1,L)$; or     Condition 1a $W\_PV(p,L)<0$ and $W\_PV(p,L)<W\_PV(p-1,L)$ and $W\_PV(p,L)<W\_PV(p+1,L)$.     Condition 1b This represents one possible technique for identifying PV jumps 306 at multiple resolution levels. Various changes may be made to this technique. For example, any number of resolution levels could be grouped together. Also, the controller 108 could calculate an estimated noise value from the first resolution level and use this noise value as an additional condition when deciding if the value $W\_PV(P,L)$ is a real local maximum/minimum point. As a particular example, the controller 108 could determine whether the value $W\_PV(P,L)$ exceeds the noise threshold. If not, the value $W\_PV(P,L)$ is not a local maximum/minimum.

Although FIG. 8 illustrates one example of a method 800 for identifying possible indications of a defective valve 104, various changes may be made to FIG. 8. For example, any other suitable technique could be used to identify possible indications of a defective valve 104.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   identifying one or more operating characteristics associated with a valve;
   identifying one or more indicators of a possible defect in the valve at each of a plurality of resolution levels using at least one of the one or more operating characteristics;
   generating a plurality of indexes associated with the resolution levels, the indexes based on the one or more indicators and each identifying a likelihood of a valve defect;
   selecting one of the plurality of resolution levels using at least one of the indexes; and
   determining an overall probability of a valve defect using at least one of the indexes that is associated with the selected resolution level.

2. The method of claim 1, wherein:
   the one or more operating characteristics comprise at least one of: (i) measurements of a process variable associated with operation of the valve and (ii) values generated to control the operation of the valve; and
   the one or more indicators comprise at least one of: (i) jumps in the process variable measurements and (ii) extreme positions in the generated control values.

3. The method of claim 2, wherein:
   the process variable measurements comprise measurements of a flow rate of one or more materials flowing through the valve; and
   the generated control values comprise values used to adjust an opening of the valve and thereby adjust the flow rate.

4. The method of claim 2, wherein identifying the one or more indicators at the plurality of resolution levels comprises:
   performing wavelet decomposition on the process variable measurements to generate wavelet coefficients at the plurality of resolution levels;
   grouping the wavelet coefficients at different resolution levels into groups; and
   identifying the jumps in the process variable measurements at the plurality of resolution levels using the groups of wavelet coefficients.

5. The method of claim 4, wherein identifying the one or more indicators at the plurality of resolution levels further comprises identifying the extreme positions in the generated control values using a number of jumps in the process variable measurements at each of the resolution levels.

6. The method of claim 1, wherein generating the plurality of indexes comprises:

using the one or more indicators to identify one or more stiction events at each of the resolution levels, each stiction event comprising a stick phase and a slip phase; and generating the plurality of indexes using at least one of the one or more stiction events, the stick phase of the one or more stiction events, and the slip phase of the one or more stiction events.

7. The method of claim 1, wherein selecting one of the resolution levels comprises selecting the resolution level having the indexes resulting in a highest likelihood of a valve defect.

8. The method of claim 1, wherein:
generating the plurality of indexes comprises identifying multiple sets of one or more stiction events using different operating characteristics and generating multiple sets of indexes using the sets of stiction events; and determining the overall probability of a valve defect comprises determining a plurality of probabilities associated with the sets of indexes and using the plurality of probabilities to determine the overall probability.

9. The method of claim 1, wherein identifying the one or more indicators at one of the resolution levels comprises identifying one or more indicators at that resolution level using data associated with multiple resolution levels.

10. The method of claim 1, further comprising:
at least one of: storing, transmitting, and displaying the overall probability of the valve defect.

11. The method of claim 10, wherein the at least one of storing, transmitting, and displaying the overall probability of the valve defect comprises:
classifying the overall probability of the valve defect into one of a plurality of classifications; and
notifying a user if the overall probability of the valve defect is classified into one of one or more specified classifications.

12. An apparatus, comprising:
a memory operable to store one or more operating characteristics associated with a valve; and
one or more processors collectively operable to:
identify one or more indicators of a possible defect in the valve at each of a plurality of resolution levels using at least one of the operating characteristics;
generate a plurality of indexes associated with the resolution levels, the indexes based on the one or more indicators and each identifying a likelihood of a valve defect;
select one of the plurality of resolution levels using at least one of the indexes; and
determine an overall probability of a valve defect using at least one of the indexes that is associated with the selected resolution level.

13. The apparatus of claim 12, wherein:
the one or more operating characteristics comprise at least one of: (i) measurements of a process variable associated with operation of the valve and (ii) values generated to control the operation of the valve; and
the one or more indicators comprise at least one of: (i) jumps in the process variable measurements and (ii) extreme positions in the generated control values.

14. The apparatus of claim 13, wherein the one or more processors are collectively operable to identify the one or more indicators at the plurality of resolution levels by:
performing wavelet decomposition on the process variable measurements to generate wavelet coefficients at the plurality of resolution levels;

grouping the wavelet coefficients at different resolution levels into groups;
identifying the jumps in the process variable measurements at the plurality of resolution levels using the groups of wavelet coefficients; and
identifying the extreme positions in the generated control values using a number of jumps in the process variable measurements at each of the resolution levels.

15. The apparatus of claim 12, wherein the one or more processors are collectively operable to generate the plurality of indexes by:
identifying one or more stiction events at each of the resolution levels using the one or more indicators, each stiction event comprising a stick phase and a slip phase; and
generating the indexes using at least one of the one or more stiction events, the stick phase of the one or more stiction events, and the slip phase of the one or more stiction events.

16. The apparatus of claim 12, wherein the one or more processors are collectively operable to select one of the resolution levels by selecting the resolution level having the indexes resulting in a highest likelihood of a valve defect.

17. The apparatus of claim 12, wherein:
the one or more processors are collectively operable to generate the plurality of indexes by identifying multiple sets of one or more stiction events using different operating characteristics and generating multiple sets of indexes using the sets of stiction events; and
the one or more processors are collectively operable to determine the overall probability of a valve defect by determining a plurality of probabilities associated with the sets of indexes and using the plurality of probabilities to determine the overall probability.

18. A computer program embodied on a computer readable medium and operable to be executed by a processor, the computer program comprising computer readable program code for:
identifying one or more indicators of a possible defect in a valve at each of a plurality of resolution levels using at least one of one or more operating characteristics associated with the valve;
generating a plurality of indexes associated with the resolution levels, the indexes based on the one or more indicators and each identifying a likelihood of a valve defect;
selecting one of the plurality of resolution levels using at least one of the indexes; and
determining an overall probability of a valve defect using at least one of the indexes that is associated with the selected resolution level.

19. The computer program of claim 18, wherein:
the one or more operating characteristics comprise at least one of: (i) measurements of a process variable associated with operation of the valve and (ii) values generated to control the operation of the valve; and
the one or more indicators comprise at least one of: (i) jumps in the process variable measurements and (ii) extreme positions in the generated control values.

20. The computer program of claim 19, wherein the computer readable program code for identifying the one or more indicators at the plurality of resolution levels comprises computer readable program code for:
performing wavelet decomposition on the process variable measurements to generate wavelet coefficients at the plurality of resolution levels;

grouping the wavelet coefficients at different resolution levels into groups;

identifying the jumps in the process variable measurements at the plurality of resolution levels using the groups of wavelet coefficients; and identifying the extreme positions in the generated control values using a number of jumps in the process variable measurements at each of the resolution levels.

21. The computer program of claim 18, wherein the computer readable program code for generating the plurality of indexes comprises computer readable program code for:

identifying one or more stiction events at each of the resolution levels using the one or more indicators, each stiction event comprising a stick phase and a slip phase; and generating the indexes using at least one of the one or more stiction events, the stick phase of the one or more stiction events, and the slip phase of the one or more stiction events.

22. The computer program of claim 18, wherein the computer readable program code for selecting one of the resolution levels comprises computer readable program code for selecting the resolution level having the indexes resulting in a highest likelihood of a valve defect.

23. The computer program of claim 18, wherein:

the computer readable program code for generating the plurality of indexes comprises computer readable program code for identifying multiple sets of one or more stiction events using different operating characteristics and generating multiple sets of indexes using the sets of stiction events; and the computer readable program code for determining the overall probability of a valve defect comprises computer readable program code for determining a plurality of probabilities associated with the sets of indexes and using the plurality of probabilities to determine the overall probability.

24. The computer program of claim 18, further comprising computer readable program code for classifying the overall probability into one of a plurality of classifications.

25. A system, comprising:

a valve;

a measuring device operable to generate measurements of a process variable associated with operation of the valve;

a controller operable to generate output values for adjusting the valve based on the process variable measurements; and a defect detector operable to:

identify one or more indicators of a possible defect in the valve at each of a plurality of resolution levels using at least one of the process variable measurements and the output values;

generate a plurality of indexes associated with the resolution levels, the indexes based on the one or more indicators and each identifying a likelihood of a valve defect;

select one of the plurality of resolution levels using at least one of the indexes; and determine an overall probability of a valve defect using at least one of the indexes that is associated with the selected resolution level.

26. The system of claim 25, wherein the defect detector forms part of the controller.

27. A method, comprising:

identifying one or more operating characteristics associated with a valve;

identifying one or more indicators of a possible defect in the valve using at least one of the one or more operating characteristics;

identifying one or more stiction patterns using the one or more indicators;

generating one or more indexes associated with one or more of the stiction patterns and each identifying a likelihood of a valve defect; and determining an overall probability of a valve defect using at least one of the one or more indexes.

* * * * *